United States Patent
Ishii et al.

(10) Patent No.: US 10,489,131 B2
(45) Date of Patent: Nov. 26, 2019

(54) EFFICIENT COMPILATION FOR LINK TIME OPTIMIZATION

(71) Applicant: FUJITSU LIMITED, Kawasaki-shi, Kanagawa (JP)

(72) Inventors: Kuninori Ishii, Kawasaki (JP); Naoki Sueyasu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/861,724

(22) Filed: Jan. 4, 2018

(65) Prior Publication Data

US 2018/0210718 A1 Jul. 26, 2018

(30) Foreign Application Priority Data

Jan. 25, 2017 (JP) .................................. 2017-010918

(51) Int. Cl.
*G06F 8/41* (2018.01)
*G06F 8/70* (2018.01)
(Continued)

(52) U.S. Cl.
CPC ............. *G06F 8/4441* (2013.01); *G06F 8/54* (2013.01); *G06F 8/60* (2013.01); *G06F 8/70* (2013.01)

(58) Field of Classification Search
CPC .... G06F 8/4443; G06F 9/44521; G06F 8/443; G06F 8/47; G06F 8/41; G06F 8/425
See application file for complete search history.

(56) References Cited

U.S. PATENT DOCUMENTS 5,850,554 A * 12/1998 Carver ...................... G06F 8/71
717/162
7,607,123 B2 * 10/2009 Chavan ............... G06F 11/3628
717/124
(Continued)

FOREIGN PATENT DOCUMENTS

JP          10-275088          10/1998
JP         2000-267860          9/2000
(Continued)

OTHER PUBLICATIONS

Jack W. Davidson; Code Selection through Object Code Optimization; ACM; pp. 505-526; retrieved on May 22, 2019 from the Internet; https://dl.acm.org/citation.cfm?id=1783 (Year: 1984).*

(Continued)

*Primary Examiner* — S. Sough
*Assistant Examiner* — Cuong V Luu
(74) *Attorney, Agent, or Firm* — Fujitsu Patent Center

(57) ABSTRACT

Upon reception of a first compilation command that contains an instruction for executing link time optimization, the apparatus generates a first object file that contains source-code information including a source code and does not contain an object code. Upon reception of a first link command that contains the instruction for executing the link time optimization, the apparatus generates the object code by executing the link time optimization and compilation on the source code information contained in the first object file, and generates a second object file that contains the generated object code. Upon reception of a second link command that does not contain an instruction for executing the link time optimization, the apparatus generates the object code by executing the compilation on the source code information contained in the first object file, and generates a third object file that contains the generated object code.

7 Claims, 12 Drawing Sheets

(51) Int. Cl.
*G06F 8/60* (2018.01)
*G06F 8/54* (2018.01)

(56) References Cited

U.S. PATENT DOCUMENTS

| | | | |
|---|---|---|---|
| 2004/0083459 A1 | 4/2004 | Roediger et al. | |
| 2004/0226004 A1* | 11/2004 | Oldman | G06F 8/36 717/136 |
| 2006/0064676 A1* | 3/2006 | Chavan | G06F 11/3628 717/124 |
| 2010/0251226 A1* | 9/2010 | Sato | G06F 8/443 717/146 |
| 2016/0357530 A1* | 12/2016 | Cheng | G06F 8/47 |
| 2017/0139694 A1* | 5/2017 | Larin | G06F 8/4441 |
| 2017/0235670 A1* | 8/2017 | Dominguez | G06F 8/447 717/140 |
| 2018/0052668 A1* | 2/2018 | Ishii | G06F 8/4441 |

FOREIGN PATENT DOCUMENTS

| | | |
|---|---|---|
| JP | 2004-152287 | 5/2004 |
| JP | 2018-32082 A | 3/2018 |

OTHER PUBLICATIONS

Kenneth Hoste et al.; COLE Compiler Optimization Level Exploration; ACM; pp. 165-174; retrieved on May 22, 2019 from the Internet; https://dl.acm.org/citation.cfm?id=1356080 (Year: 2008).*

Juan Chen et al.; Type-Preserving Compilation for Large-Scale Optimizing Object-Oriented Compilers; ACM; pp. 183-192; retrieved on May 22, 2019 from the Internet; https://dl.acm.org/citation.cfm?id=1375604 (Year: 2008).*

Dibyendu Das; Optimizing Subroutines with Optional Parameters in F90 via Function Cloning; ACM; pp. 21-28; retrieved on May 22, 2019 from the Internet; https://dl.acm.org/citation.cfm?id=1163573 (Year: 2006).*

Michael D. Wilder; The Uniconc Optimizing Unicon Compiler; ACM; pp. 756-757; retrieved on Aug. 16, 2019 (Year: 2006).*

Albert Noll et al.; Online Feedback-Directed Optimizations for Parallel Java Code; ACM; pp. 713-728; retrived on Aug. 16, 2019 (Year: 2013).*

Zoran Budimlic et al.; Almost-Whole-Program Compilation; ACM; pp. 104-111; retrieved on Aug. 16, 2019 (Year: 2002).*

* cited by examiner

EFFICIENT COMPILATION FOR LINK TIME OPTIMIZATION

CROSS-REFERENCE TO RELATED APPLICATION

This application is based upon and claims the benefit of priority of the prior Japanese Patent Application No. 2017-10918, filed on Jan. 25, 2017, the entire contents of which are incorporated herein by reference.

FIELD

The embodiment discussed herein is related to efficient compilation for link time optimization.

BACKGROUND

In some cases, optimization across source files (for example, inline expansion, constant propagation, and the like) is effective for a source file containing a source program written in a programming language such as C, C++, and Fortran. The optimization across source files is performed by confirming all source files based on object files obtained at link time. The optimization across source files performed at link time is called link time optimization (LTO).

When the link time optimization is executed, an object file, which contains an object code generated by compilation executed in accordance with a compilation command (hereinafter referred as first pass compilation) and source program information, is generated. Then, at the link time, optimization is performed using the source program information in the object file, and compilation is executed again on the optimization result (hereinafter referred as second pass compilation). Once the object code as this execution result is linked, build is completed and an executable file is generated.

When the link time optimization is not executed, the object file containing the first pass compilation result is linked. However, when the link time optimization is executed, the object file containing the second pass compilation result is linked; thus, the object file containing the first pass compilation result is not linked.

Related techniques are disclosed in, for example, Japanese Laid-open Patent Publication Nos. 2000-267860, 10-275088, and 2004-152287.

SUMMARY

According to an aspect of the invention, upon reception of a first compilation command that contains an instruction for executing link time optimization, the apparatus generates a first object file that contains source-code information including a source code and does not contain an object code. Upon reception of a first link command that contains the instruction for executing the link time optimization, the apparatus generates the object code by executing the link time optimization and compilation on the source code information contained in the first object file, and generates a second object file that contains the generated object code. Upon reception of a second link command that does not contain an instruction for executing the link time optimization, the apparatus generates the object code by executing the compilation on the source code information contained in the first object file, and generates a third object file that contains the generated object code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

As mentioned above, when the link time optimization is executed, the first pass compilation is unnecessary; however, such a method has been employed in order to deal with the both cases: the link time optimization is executed and the link time optimization is not executed. This causes time prolongation of generating an executable file from a source file. In the conventional techniques, such a problem of the link time optimization has not been discussed.

It is preferable to provide a technique for shortening the time for generating an executable file from a source file.

Figure 1:
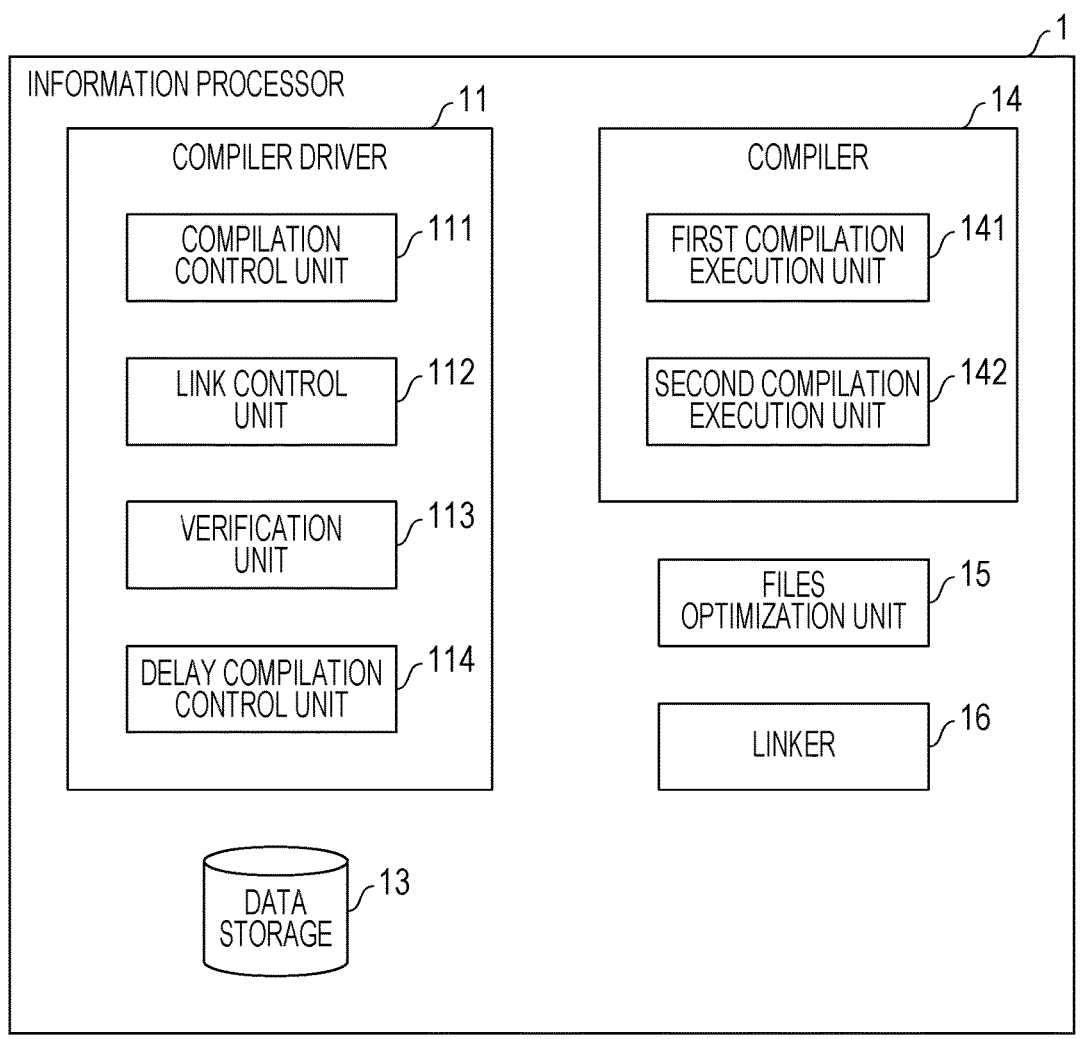
FIG. 1 is a diagram illustrating an example of a functional configuration of information processor.

FIG. 1 illustrates a functional block diagram of an information processor 1 of the embodiment. The information processor 1 includes a compiler driver 11, a data storage 13, a compiler 14, a cross-file optimization unit 15, and a linker 16. The compiler driver 11 includes a compilation control unit 111, a link control unit 112, a verification unit 113, and a delay compilation control unit 114. The compiler 14 includes a first compilation execution unit 141 and a second compilation execution unit 142.

Figure 13:
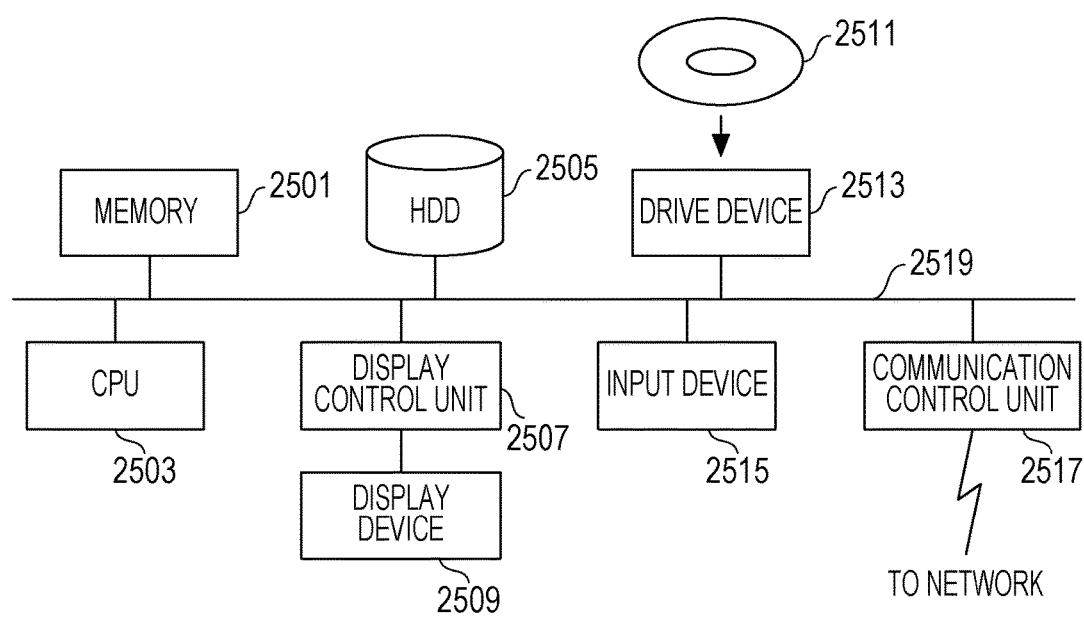
FIG. 13 is a diagram illustrating an example of a configuration of a computer.

The compiler driver 11, the compiler 14, the cross-file optimization unit 15, and the linker 16 are, for example, implemented by executing a program loaded in a memory 2501 illustrated in FIG. 13, which is executed by a central processing unit (CPU) 2503. The data storage 13 is, for example, provided in the memory 2501 and a hard disk drive (HDD) 2505.

The compiler driver 11 is called from a command line and controls the compiler 14, the cross-file optimization unit 15, and the linker 16. The compilation control unit 111 controls the compiler 14. The link control unit 112 controls the cross-file optimization unit 15 and the linker 16. The verification unit 113 determines whether an object code is contained in an object file. The delay compilation control unit 114 controls execution of delay compilation performed by the second compilation execution unit 142. An object file in the embodiment includes at least any one of an object code and source program data. The object code is a program containing an instruction string generated by compilation on a source file (in this case, meaning compilation in a narrow sense; hereinafter, the same applies except as otherwise specified). The source program data contains data on a source program (a source program itself, for example). The source file is a file containing a source program.

The data storage 13 stores data to be used for the processing of the embodiment and data as a result of processing of the embodiment. Compilation includes object code generation processing and object file generation processing. Note that compilation in a wide sense is a series of processing of generating an object file from a source file, and the compilation in a wide sense includes the compilation in a narrow sense.

The compiler 14 executes compilation. The first compilation execution unit 141 executes compilation in response to a compilation command. The second compilation execution unit 142 executes compilation in response to a link command.

The cross-file optimization unit 15 generates a cross-file optimization intermediate file by executing cross-file optimization. The cross-file optimization is optimization performed over multiple source programs. The cross-file optimization intermediate file contains a cross-file optimization intermediate program. The cross-file optimization intermediate program is a program in a type that is readable by the compiler 14 and contains a source program or intermediate information.

The linker 16 generates an executable file by executing link processing. The executable file contains an instruction in a machine language, which is interpreted by a processor (the CPU or a micro-processing unit (MPU), for example), the other data, and the like.

Figures 2, 3:
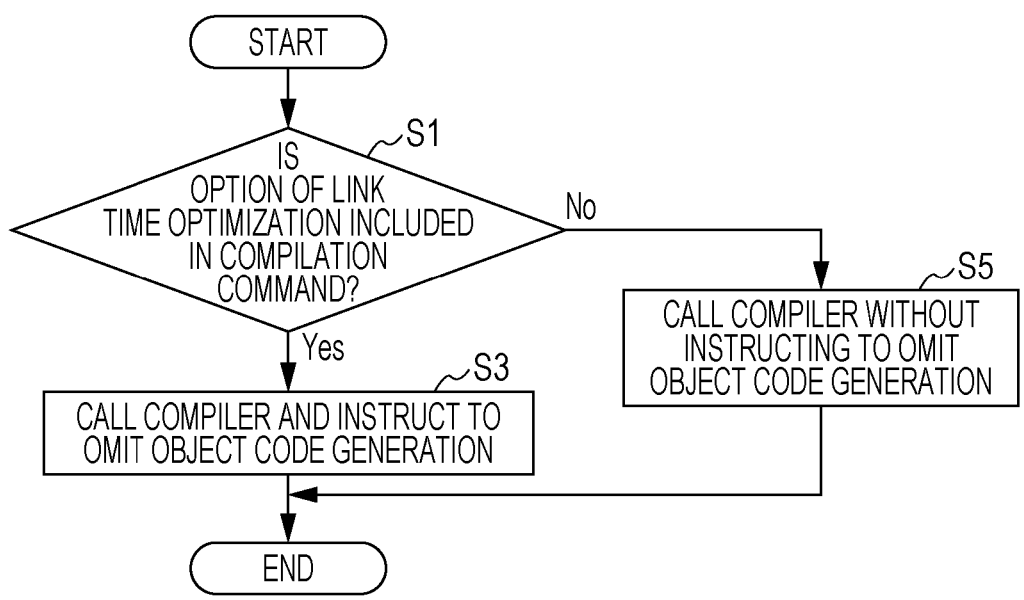
FIG. 2 is a diagram that illustrates an example of compilation commands and link commands.
FIG. 3 is a diagram that illustrates an example of an operational flowchart for processing to generate an object file from a source file.

FIG. 2 illustrates an example of compilation commands and link commands inputted by a user. In the example in FIG. 2, "fcc" is used as a compilation command and a link command. In addition, after an option "-o", an output file name is specified. Thus, according to the compilation commands illustrated in FIG. 2, an object file "a.o" is generated from a source file "a.c", an object file "b.o" is generated from a source file "b.c", an object file "c.o" is generated from a source file "c.c", and an object file "d.o" is generated from a source file "d.c". In addition, an executable file "x.exe" is generated from the object files "a.o" and "b.o", an executable file "y.exe" is generated from the object files "a.o" and "c.o", and an executable file "z.exe" is generated from the object files "a.o" and "d.o".

Whether link time optimization is executed may be switched by an instruction, such as an option of a command at compilation and an option of a command at link time. In the example of FIG. 2, an option instructing the link time optimization is "-Klto", and a condition for executing the link time optimization is that the options "-Klto" are contained in both the compilation command and the link command. In this case, since the above options are contained in the compilation command for generating the object file "a.o", the compilation command for generating the object file "b.o", and the link command for linking the object files "a.o" and "b.o" and generating the executable file "x.exe", the link time optimization is executed. In other words, a cross-file optimization intermediate file corresponding to the source file "a.c" and a cross-file optimization intermediate file corresponding to the source file "b.c" are generated, and after compilation and linking, the executable file "x.exe" is generated.

Next, processing executed by the information processor 1 is described with FIGS. 3 to 12. First of all, processing of generating an object file from a source file is described with FIGS. 3 to 6B.

Firstly, the compilation control unit 111 determines whether the option instructing execution of the link time optimization is contained in a compilation command that is received from a user terminal, an input device of the information processor 1, or the like (FIG. 3: step S1).

When the option instructing execution of the link time optimization is contained in the received compilation command (step S1: Yes route), the compilation control unit 111 calls the compiler 14 and instructs the compiler 14 to omit generating an object code (step S3).

On the other hand, when the option instructing execution of the link time optimization is not contained in the received compilation command (step S1: No route), the compilation control unit 111 calls the compiler 14 without instructing the compiler 14 to omit generating an object code (step S5). The processing then ends.

Figure 4:
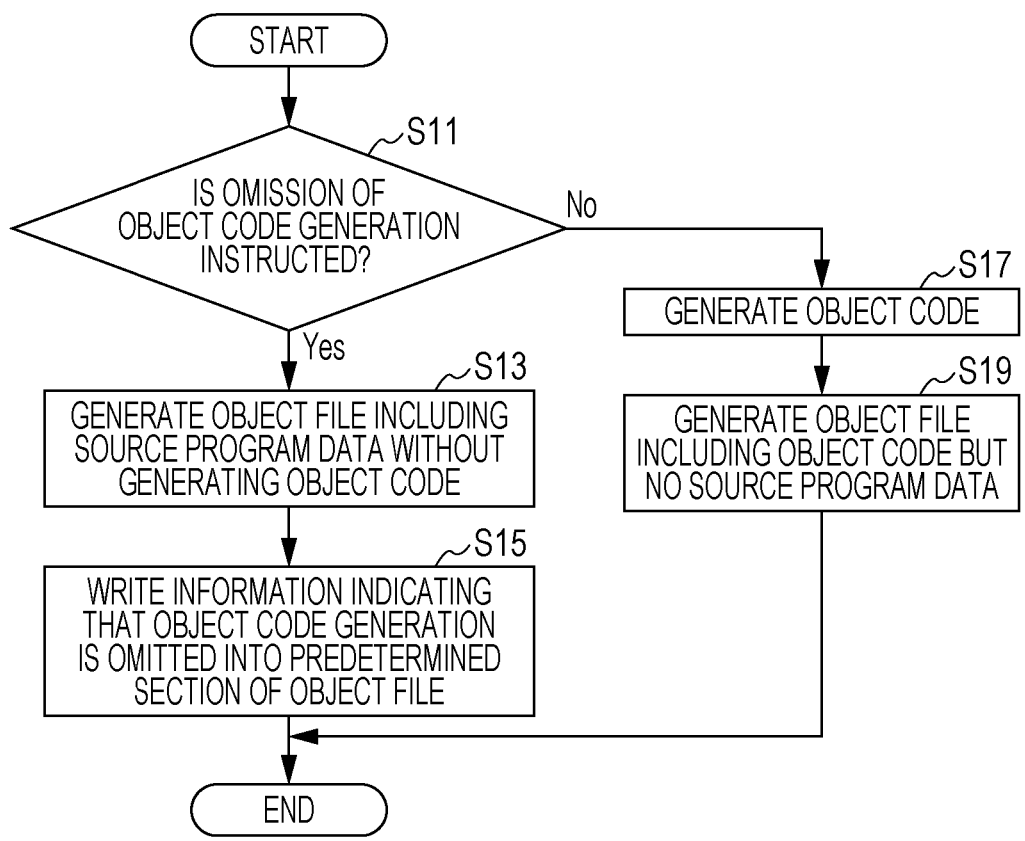
FIG. 4 is a diagram that illustrates an example of an operational flowchart for processing executed by a first compilation execution unit.

Now, processing executed by the first compilation execution unit 141 of the compiler 14 in response to a call from the compilation control unit 111 is described with FIG. 4.

The first compilation execution unit 141 determines whether an instruction to omit generating an object code is provided by the compilation control unit 111 (FIG. 4: step S11).

When the first compilation execution unit 141 is instructed by the compilation control unit 111 to omit generating an object code (step S11: Yes route), the first compilation execution unit 141 executes the following processing. In specific, the first compilation execution unit 141 generates an object file containing source program data without generating an object code by compilation of a source file (step S13). The source program data is assumed to be, for example, stored in the data storage 13 in advance.

The first compilation execution unit 141 writes information indicating that the object code generation is omitted in a predetermined section (for example, ".comment" section) of the object file generated in step S13 (step S15). The first compilation execution unit 141 then stores the object file into the data storage 13.

On the other hand, when the first compilation execution unit 141 is not instructed by the compilation control unit 111 to omit generating an object code (step S11: No route), the first compilation execution unit 141 executes the following processing. In specific, the first compilation execution unit 141 executes compilation on the source program contained in the source file that is stored in the data storage 13 and generates an object code (step S17).

The first compilation execution unit 141 generates an object file containing the object code generated in step S17 but no source program data (step S19) and stores the generated object file into the data storage 13. The processing then ends.

Figure 5A:
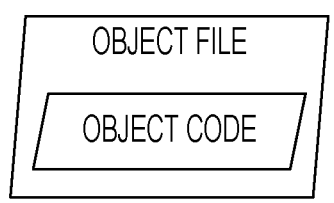
FIGS. 5A and 5B are diagrams that illustrate an example of an object file generated from a source file.
Figure 5B:
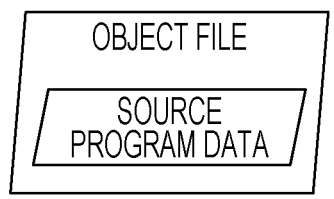

In a case of executing the above processing, when the option instructing execution of the link time optimization is not contained in the compilation command, an object file containing the object code but no source program data is generated as illustrated in FIG. 5A, for example. On the other hand, when the option instructing execution of the link time optimization is contained in the compilation command, an object file containing the source program data but no object code is generated as illustrated in FIG. 5B, for example.

Figure 6A:
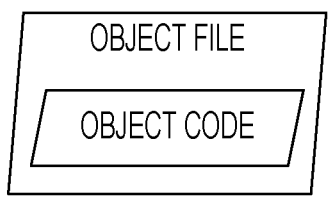
FIGS. 6A and 6B are diagrams that illustrate another example of an object file generated from a source file.
Figure 6B:
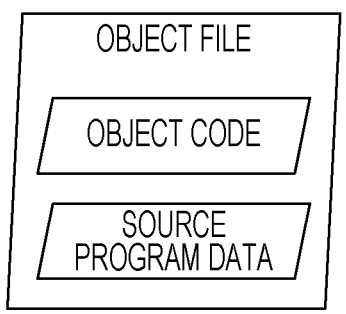

Meanwhile, in conventional techniques, when the option instructing execution of the link time optimization is not contained in the compilation command, an object file containing the object code but no source program data is generated as illustrated in FIG. 6A, for example. When the option instructing execution of the link time optimization is contained in the compilation command, an object file containing the object code and the source program data is generated as illustrated in FIG. 6B, for example.

As mentioned in the background chapter, since the first pass object code is not linked when the link time optimization is executed, the object code generated by compilation is unnecessary. In the example in FIG. 2, the object code contained in the object file "b.o" that is generated in accordance with the option "-Klto" in the compilation command "fcc b.c -o b.o -c -Klto" is not linked by further link commands.

However, like the method of the embodiment, if the object code generation is omitted when the option instructing the link time optimization is contained in the compilation command, that is, when there is a possibility in which the link time optimization is executed, the unnecessary object code is not generated.

However, even if the option instructing the link time optimization is contained in the compilation command, the link time optimization is not executed when the option instructing the link time optimization is not contained in the link command. When the link time optimization is not executed, it is impossible to implement link without generating an object code. Thus, in the embodiment, an object code is generated at link time with the following method.

Next, processing at link time is described with FIGS. 7 to 12.

Figure 7:
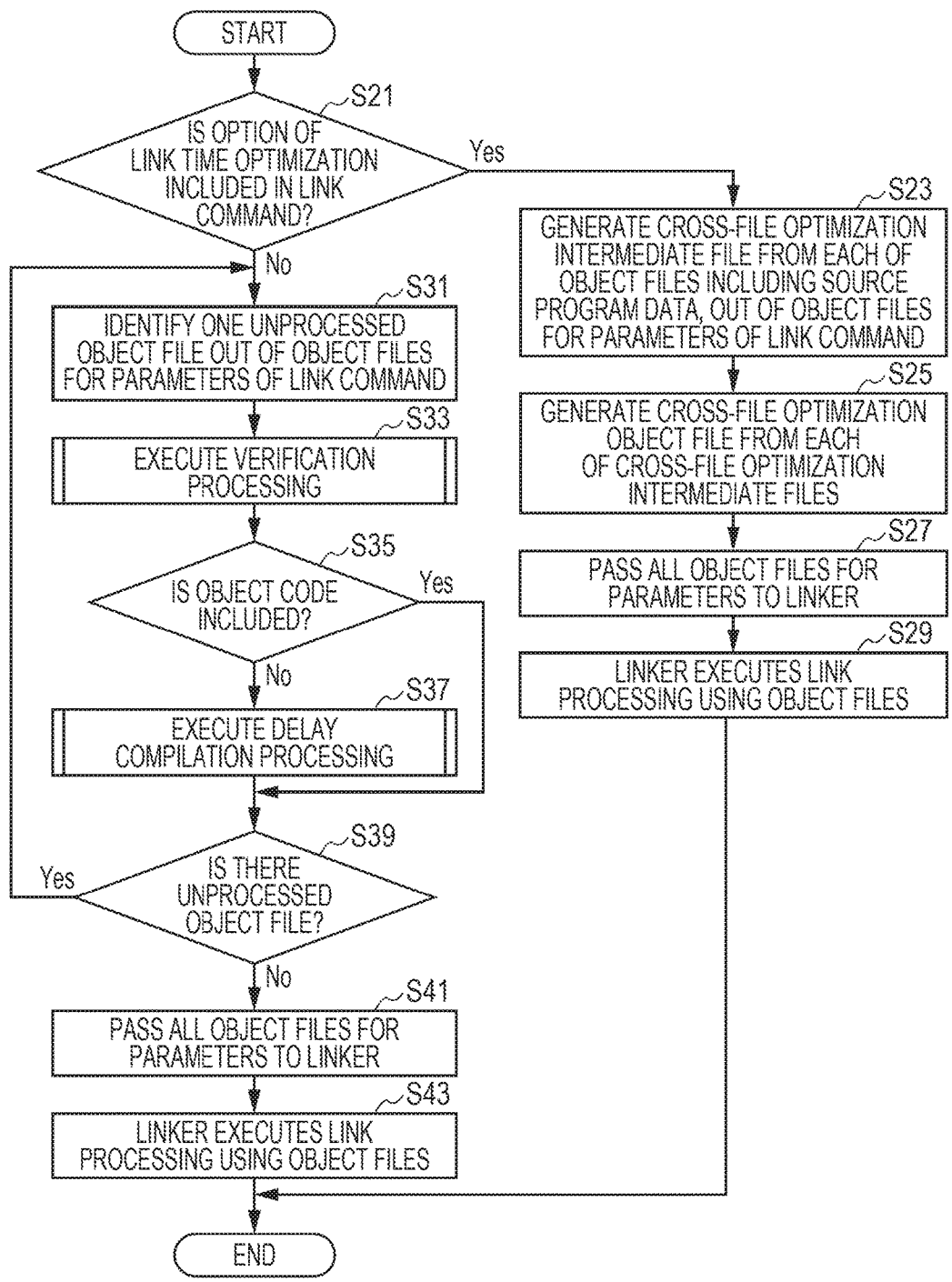
FIG. 7 is a diagram that illustrates an example of an operational flowchart for processing at link time.

Firstly, the link control unit 112 determines whether the option instructing execution of the link time optimization is contained in the link command received from the user terminal, the input device of the information processor 1, or the like (FIG. 7: step S21).

When the option instructing execution of the link time optimization is contained in the received link command (step S21: Yes route), the link control unit 112 calls the cross-file optimization unit 15. The cross-file optimization unit 15 generates a cross-file optimization intermediate file by cross-file optimization from, out of object files indicated by parameters of the link command, each of object files containing source program data (step S23). The cross-file optimization unit 15 passes the generated cross-file optimization intermediate file to the compiler 14. Each object file is assumed to be generated by executing the compilation command and stored in the data storage 13. The cross-file optimization intermediate file is a file containing a cross-file optimization intermediate program. The cross-file optimization intermediate program is a program on which the cross-file optimization is performed, and is a source program or intermediate information in the form readable by the compiler 14.

The first compilation execution unit 141 of the compiler 14 generates a cross-file optimization object file by compilation from each of the cross-file optimization intermediate files received from the cross-file optimization unit 15 (step S25). The first compilation execution unit 141 stores the generated cross-file optimization object file into the data storage 13. The generated cross-file optimization object file is an object file generated by compilation on the cross-file optimization intermediate file, and contains an object code.

The first compilation execution unit 141 passes all the object files for the parameters of the link command (in this case, including the cross-file optimization object files generated in step S25 and object files, out of object files for the parameters of the link command, that contains no source program data) to the linker 16 (step S27).

The linker 16 executes link processing using the object file received from the first compilation execution unit 141 (step S29) and generates an executable file. The linker 16 stores the generated executable file into the data storage 13.

On the other hand, when the option instructing execution of the link time optimization is not contained in the received link command, (step S21: No route), the link control unit 112 executes the following processing. In specific, the link control unit 112 identifies one unprocessed object file out of the object files for the parameters of the link command (step S31).

The link control unit 112 calls the verification unit 113, and the verification unit 113 executes verification processing (step S33). The verification processing is described with FIG. 8.

Figure 8:
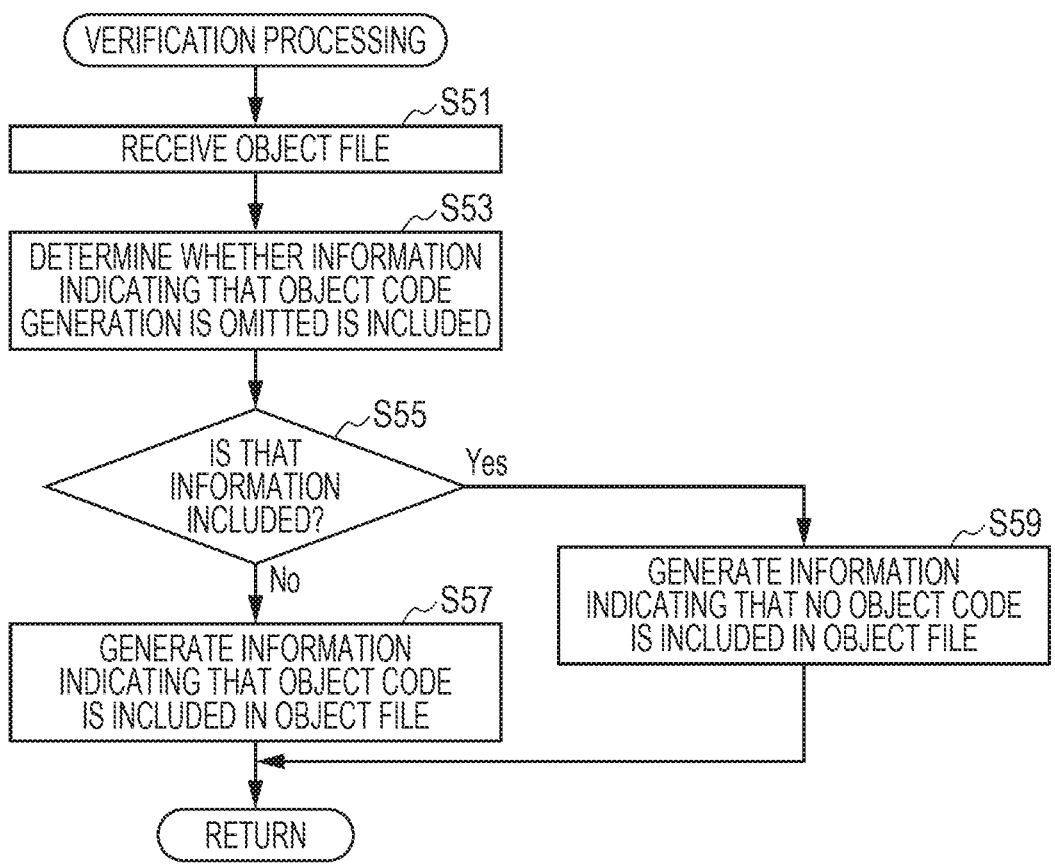
FIG. 8 is a diagram that illustrates an example of an operational flowchart for verification processing.
Figure 9:
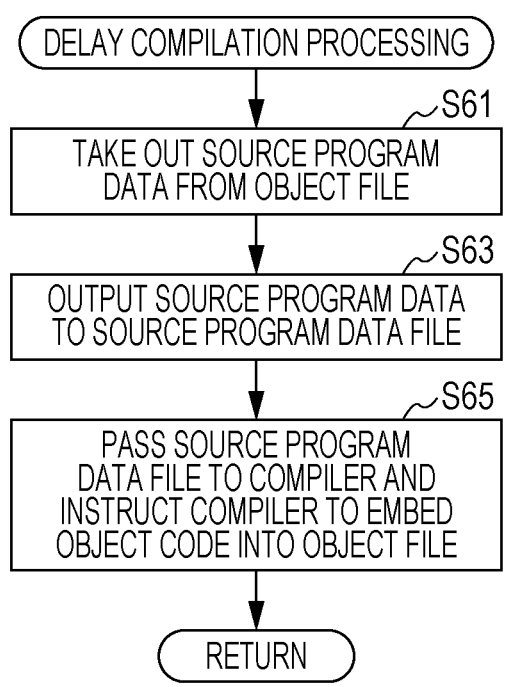
FIG. 9 is a diagram that illustrates an example of an operational flowchart for delay compilation processing.

Firstly, the verification unit 113 receives the object file identified in step S31 from the link control unit 112 (FIG. 8: step S51).

The verification unit 113 determines whether information indicating that the object code generation is omitted is included in the object file received in step S51 (step S53).

When the information indicating that the object code generation is omitted is not included (step S55: No route), the verification unit 113 generates information indicating that the object code is included in the object file (step S57) and stores the generated information into the data storage 13.

On the other hand, when the information indicating that the object code generation is omitted is included (step S55: Yes route), the verification unit 113 generates information indicating that no object code is included in the object file (step S59) and stores the generated information into the data storage 13. The processing then returns to the caller.

Returning to description of FIG. 7, based on the information that the verification unit 113 stores into the data storage 13, the link control unit 112 determines whether an object code is included in the object file identified in step S31 (step S35). When the object code is included in the object file identified in step S31 (step S35: Yes route), compilation does not have to be executed; thus, the processing proceeds to step S39.

On the other hand, when no object code is included in the object file identified in step S31 (step S35: No route), the link control unit 112 calls the delay compilation control unit 114, and the delay compilation control unit 114 executes the delay compilation processing (step S37). The delay compilation processing is described with FIGS. 9 and 10.

Firstly, the delay compilation control unit 114 receives the object file identified in step S31 from the link control unit 112. The delay compilation control unit 114 then takes out the source program data from the received object file (FIG.

9: step S61). When the object code is not included in the object file, the source program data is included in the object file.

The delay compilation control unit 114 outputs the source program data taken out in step S61 to a source program data file (step S63). The source program data file is a file in a form processable by the compiler 14 and includes the source program data. When the compiler 14 is able to directly process the source program data, step S63 may be skipped.

The delay compilation control unit 114 passes the source program data file to the compiler 14, and instructs the compiler 14 to embed the object code into the object file (step S65). The processing then returns to the caller. Note that this instruction includes an instruction for setting the object file identified in step S31 as an embedment target. In this way, the object code is also embedded into the object file identified in step S31 in addition to the source program data contained therein.

Now, processing executed by the compiler 14 that receives the source program data file from the delay compilation control unit 114 is described.

Figure 10:
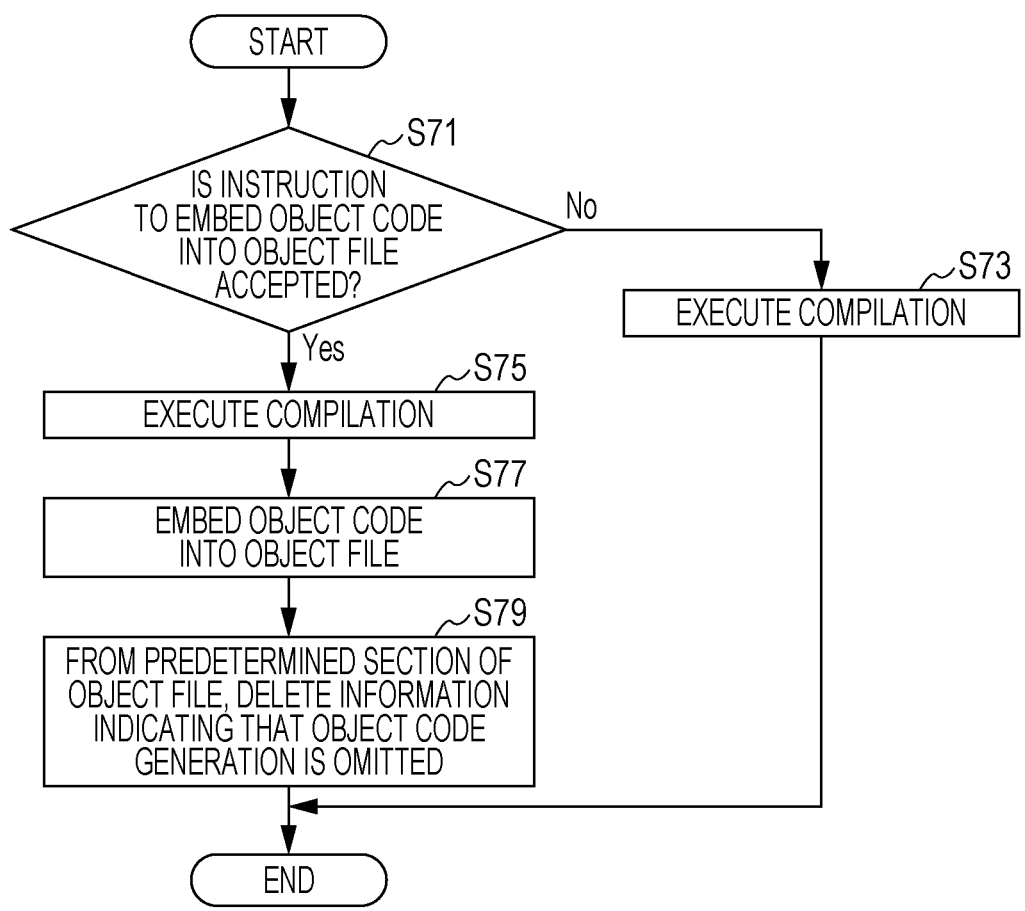
FIG. 10 is a diagram that illustrates an example of an operational flowchart for processing executed by a second compilation execution unit.

The second compilation execution unit 142 of the compiler 14 determines whether an instruction for embedding the object code into the object file is accepted from the delay compilation control unit 114 (FIG. 10: step S71).

When the instruction for embedding the object code into the object file is not accepted (step S71: No route), the second compilation execution unit 142 executes compilation (step S73). In specific, from the source program data file received from the delay compilation control unit 114, the second compilation execution unit 142 generates by compilation an intra-file optimization object file containing the source program data and the object code. The second compilation execution unit 142 stores the generated intra-file optimization object file into the data storage 13. The intra-file optimization object file is an object file generated only by optimization in a form closed in a single file. Note that the processing in step S73 is conventional compilation, and the object file generated in step S73 is different from the object file identified in step S31.

On the other hand, when the instruction for embedding the object code into the object file is accepted (step S71: Yes route), the second compilation execution unit 142 executes compilation on the source program data file received from the delay compilation control unit 114 (step S75). Further, the second compilation execution unit 142 embeds the object code generated by the compilation into the object file identified in step S31 (step S77).

The second compilation execution unit 142 deletes the information indicating that the object code generation is omitted, from a predetermined section of the object file into which the object code is embedded in step S77 (step S79). The second compilation execution unit 142 stores the object file on which the processing in step S79 is executed into the data storage 13. The processing then ends.

Returning to description of FIG. 7, the link control unit 112 determines whether there is an unprocessed object file in the object files for the parameters of the link command (step S39). When there is an unprocessed object file (step S39: Yes route), the processing returns to step S31.

On the other hand, when there are no unprocessed object files (step S39: No route), the link control unit 112 reads all object files for the parameters from the data storage 13 and passes the object files to the linker 16 (step S41).

The linker 16 executes link processing using the object files received from the link control unit 112 (step S43) and generates an executable file. The linker 16 stores the generated executable file into the data storage 13. The processing then ends.

With execution of the above processing, even if the link time optimization is not executed with no object code contained in the object file, it is possible to prepare an object code to be linked. In other words, even when the first pass compilation is omitted, it is possible to generate an appropriate executable file.

Figure 11:
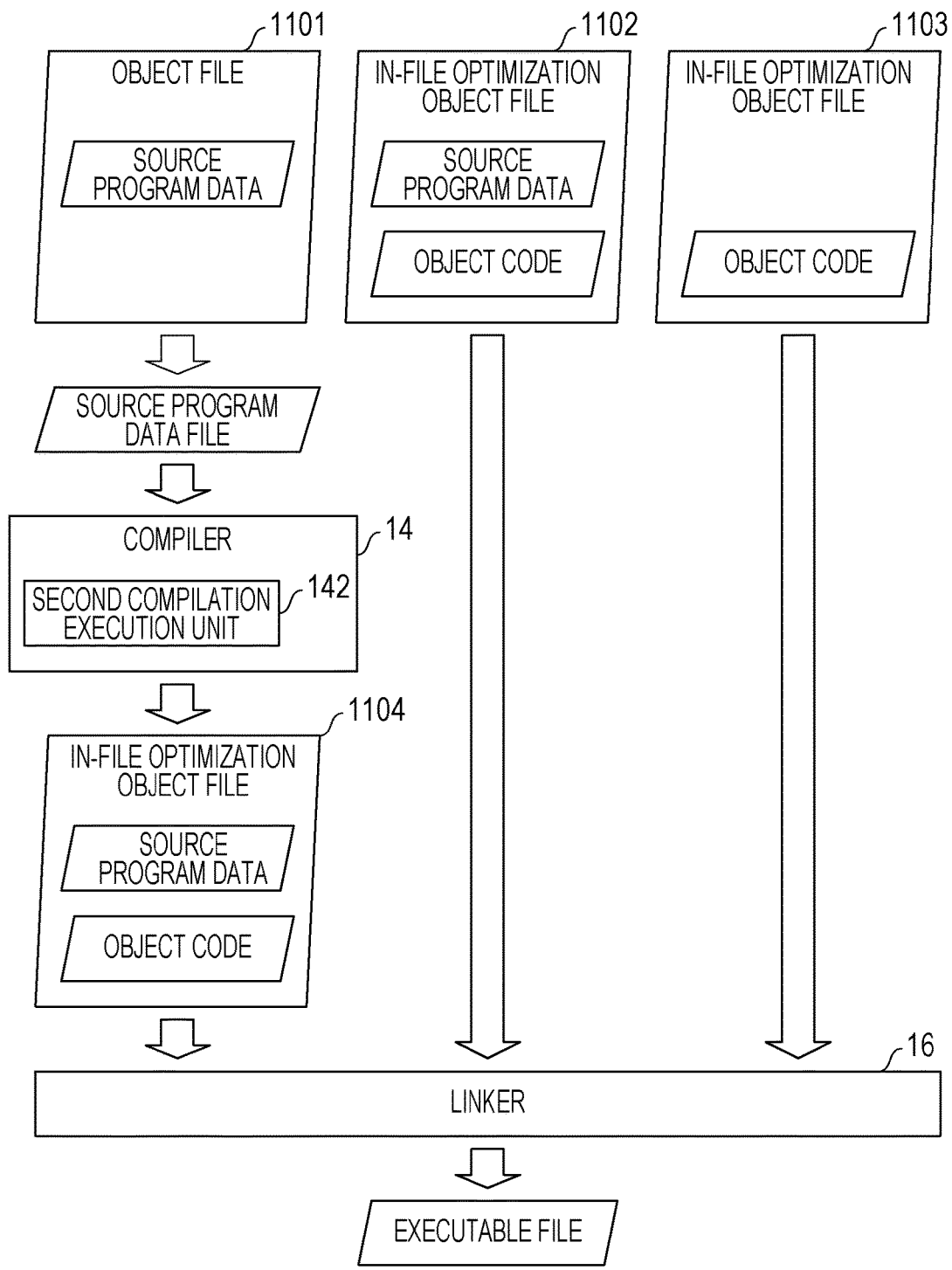
FIG. 11 is a diagram illustrating an example of processing at link time.
Figure 12:
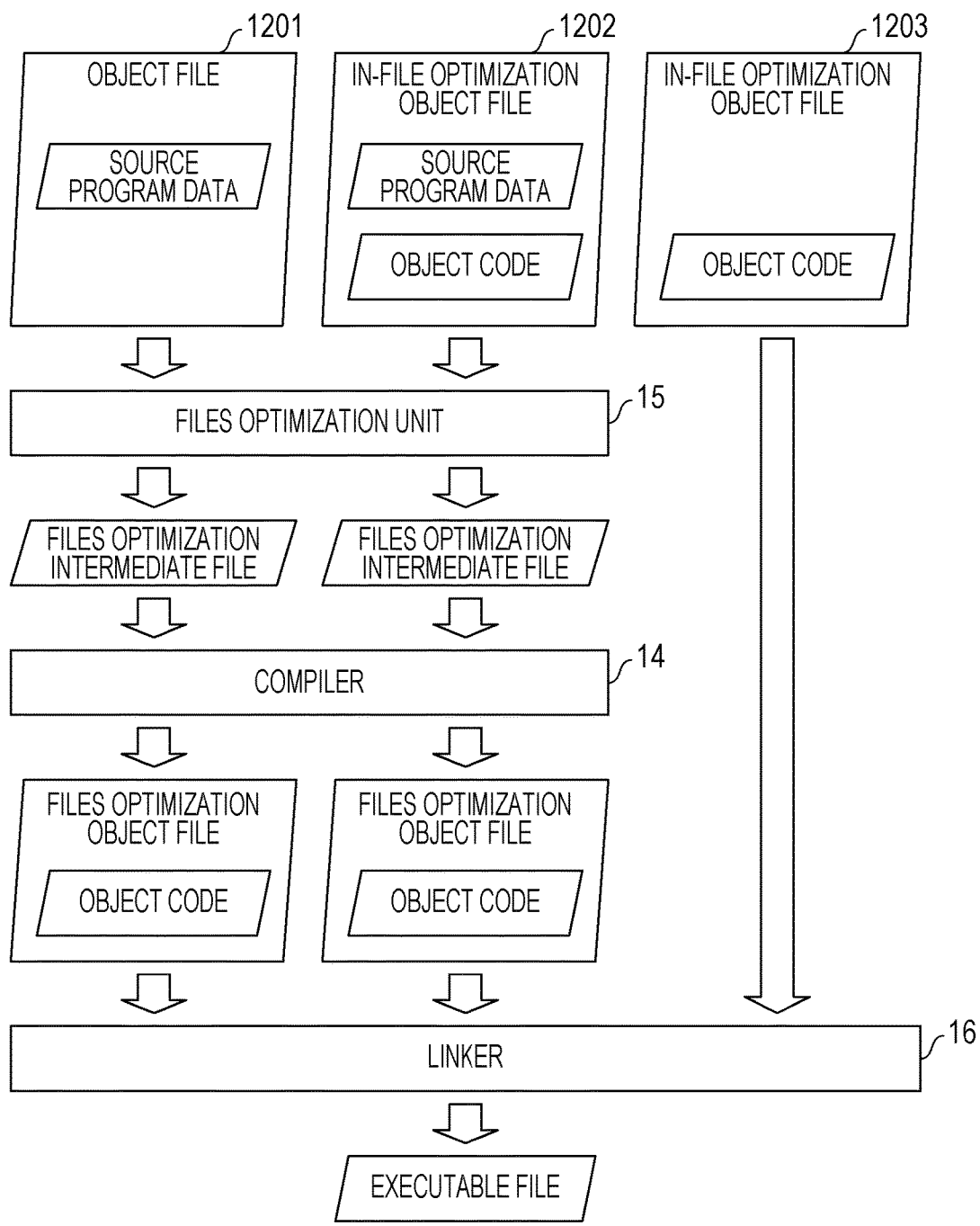
FIG. 12 is a diagram illustrating an example of processing at link time.

Description of processing at link time is added with FIGS. 11 and 12.

Processing in a case where the option indicating the link time optimization is not contained in the link command is described with FIG. 11. The object files as link targets are an object file 1101 containing source program data, an intra-file optimization object file 1102 containing source program data and an object code, and an intra-file optimization object file 1103 containing an object code.

The intra-file optimization object file 1102 is not generated directly by processing described with FIGS. 3 to 6B but generated by executing the delay compilation on the object file containing source program data to embed an object code thereinto. In other words, the intra-file optimization object file 1102 is an object file that is linked at least once and is reused in this link processing. For example, when an object code is embedded into "a.o" and linked at link time according to any link command, the object file "a.o" is saved in the data storage 13. When "a.o" is specified as an object file according to another link command, the object code contained in the already generated object file "a.o" is reused instead of embedding a new object code into the object file "a.o". In this way, it is possible to further shorten the time for generating an executable file.

Since the intra-file optimization object file 1102 and the intra-file optimization object file 1103 contain object codes, the object codes are directly linked without executing compilation at link time.

On the other hand, the object file 1101 contains no object code. Thus, the second compilation execution unit 142 generates an intra-file optimization object file 1104 containing source program data and an object code from the source program data file. The generated intra-file optimization object file is linked. In addition, the generated intra-file optimization object file is stored into the data storage 13 and reused to another link processing.

Processing in a case where the option instructing the link time optimization is contained in the link command is described with FIG. 12. The object files as link targets are an object file 1201 containing source program data, an intra-file optimization object file 1202 containing source program data and an object code, and an intra-file optimization object file 1203 containing an object code.

The intra-file optimization object file 1202 is not generated directly by processing described with FIGS. 3 to 6B but generated by executing the delay compilation on the object file containing source program data to embed an object code thereinto. This is same as what described with FIG. 11.

The cross-file optimization unit 15 executes cross-file optimization on the object file 1201 and the intra-file optimization object file 1202, and a cross-file optimization intermediate files are generated. Further, the first compilation execution unit 141 of the compiler 14 executes compilation on the cross-file optimization intermediate files, and cross-file optimization object files containing an object code are generated. The generated cross-file optimization object files are linked. Meanwhile, the intra-file optimization object file 1203 is directly linked.

As described above, according to the method of the embodiment, it is possible to omit the processing of creating an unnecessary object code that is not linked, and thus, it is possible to shorten the time taken for completion of an executable file. In addition, even when a part of the object code generation is omitted, link is performed appropriately.

Moreover, regardless of whether the option instructing execution of the link time optimization is specified or not, it is possible to specify the object file generated at execution of the compilation command as an input of link. Thus, a user interface for the input of the compilation command and the link command may be the same as a conventional user interface.

The method of the embodiment is described more specifically with a command group in FIG. 2 as an example. As described above, the compilation command and the link command are represented as "fcc", and the option instructing the link time optimization is assumed to be "-Klto". In addition, the link time optimization is effective when the option "-Klto" is contained in both the compilation command and the link command.

Since the option "-Klto" is contained in the compilation command "fcc a.c -o a.o -c -Klto", the compilation control unit 111 instructs the compiler 14 to omit the object code generation. The first compilation execution unit 141 of the compiler 14 generates the object file "a.o" without generating an object code and embeds source program data related to the source file "a.c" into the object file "a.o". In addition, the first compilation execution unit 141 writes information indicating that the object code generation is omitted in the object file "a.o".

Since the option "-Klto" is contained in the compilation command "fcc b.c -o b.o -c -Klto", the object file "b.o" is generated without generating an object code, and source program data related to the source file "b.c" is embedded into the object file "b.o" likewise. In addition, the first compilation execution unit 141 writes information indicating that the object code generation is omitted in the object file "b.o".

Since the option "-Klto" is not contained in the compilation command "fcc c.c -o c.o -c", the compilation control unit 111 calls the compiler 14 without instructing the compiler 14 to omit the object code generation. The first compilation execution unit 141 of the compiler 14 executes compilation on the source program contained in the source file "c.c" and generates the object file "c.o".

Since the option "-Klto" is not contained in the compilation command "fcc d.c -o d.o -c", the first compilation execution unit 141 executes compilation on the source program contained in the source file "d.c" and generates the object file "d.o" likewise.

Since the option "-Klto" is contained in the link command "fcc a.o b.o -o x.exe -Klto", the link time optimization is executed, and the executable file "x.exe" is generated.

Since the option "-Klto" is not contained in the link command "fcc a.o c.o -o y.exe", the verification unit 113 determines whether an object code is contained in the object file "a.o". In this case, since it is determined that no object code is contained in the object file "a.o", the second compilation execution unit 142 generates an object code and embeds the object code into the object file "a.o". The verification unit 113 also determines whether an object code is contained in the object file "c.o". In this case, it is determined that an object code is contained in the object file "c.o", and the object file "c.o" is directly outputted to the linker 16. Then, link is executed on the object files "a.o" and "c.o", and the executable file "y.exe" is generated.

Finally, since the option "-Klto" is not contained in the link command "fcc a.o d.o -o z.exe", the verification unit 113 determines whether an object code is contained in the object file "a.o". In this case, it is determined that an object code is contained in the object file "a.o" (in other words, it is possible to reuse the already generated object code in the object file "a.o"), and the object file "a.o" is directly outputted to the linker 16. The verification unit 113 also determines whether an object code is contained in the object file "d.o". In this case, it is determined that an object code is contained in the object file "d.o", and the object file "d.o" is directly outputted to the linker 16. Then, link is executed on the object files "a.o" and "d.o", and the executable file "z.exe" is generated.

One embodiment of the present disclosure is described above; however, the present disclosure is not limited thereto. For example, in some cases, the configuration of each functional block of the information processor 1 described above does not match an actual program module configuration.

In addition, the above-described data configuration is an example and does not necessarily have to be the above configuration. Further, also for the processing flow, it is possible to switch the order of the processing without changing the processing result. Furthermore, the processing flow may be executed in parallel.

Note that the above-described information processor 1 is a computer device, and, as illustrated in FIG. 13, the memory 2501, the CPU 2503, the HDD 2505, a display control unit 2507 coupled to a display device 2509, a drive device 2513 for a removable disk 2511, an input device 2515, and a communication control unit 2517 for connecting to a network are coupled with a bus 2519. An operating system (OS) and an application program for executing the processing in this example are stored in the HDD 2505, and when the OS and the application program are executed by the CPU 2503, they are read from the HDD 2505 to the memory 2501. According to the processing details of the application program, the CPU 2503 controls the display control unit 2507, the communication control unit 2517, and the drive device 2513 and causes them to perform predetermined operations. Data during processing is mainly stored in the memory 2501, but may be stored in the HDD 2505. In the example of the present disclosure, the application program for implementing the above-described processing is stored in the computer-readable removable disk 2511 to be distributed, and installed via the drive device 2513 into the HDD 2505. In some cases, the application program may be installed into the HDD 2505 by way of a network such as the Internet, and the communication control unit 2517. Such a computer device implements the above-described various functions through organic cooperation of hardware such as the above-described CPU 2503 and the memory 2501 as well as a program such as the OS and the application program.

The above-described embodiment of the present disclosure is summarized as follows.

A compilation method according to a first aspect of the embodiment includes the processing of: (A) when a first compilation command containing an instruction for executing link time optimization is received, generating a first object file containing source code information but no object code; (B) when a first link command containing the instruction for executing the link time optimization is received, generating the object code by executing the link time optimization and compilation on the source code information contained in the first object file, and generating a second object file containing the generated object code; and (C) when a second link command containing no instruction for executing the link time optimization is received, generating the object code by executing the compilation on the source code information contained in the first object file, and generating a third object file containing the generated object code.

Since unnecessary object code is not generated, it is possible to shorten the time taken for generating an executable file as a result.

In addition, the present compilation method may further include the processing of: (D) when a second compilation command containing no instruction for executing the link time optimization, generating the object code by executing the compilation on the source code information, and generating a fourth object file containing the generated object file but no source code information; and (E) when the second link command is received, outputting the fourth object file to a linker.

In the conventional techniques, in a case where the link time optimization is not executed, no object code is generated when the link command is executed. While the above-described processing is executed, it is possible to output an object file containing an appropriate object code to the linker.

In addition, the present compilation method may further include the processing of: (F) when the first link command is received, outputting the fourth object file to the linker.

In some cases, the link time optimization is not executed when the instructions for executing the link time optimization are not contained in the both compilation command and the link command. While the above-describe processing is executed, it is possible to output an appropriate object file to the linker.

In addition, the present compilation method may further include the processing of: (G) when a third link command containing no instruction for executing the link time optimization is received, outputting the third object file to a linker.

It is possible to omit the processing of generating an object code corresponding to the source code. In other words, it is possible to reuse the third object file.

In addition, in the processing of generating the first object file, (a1) first information indicating that the object code generation is omitted may be written in a predetermined section of the first object file, and in the processing of generating the third object file, (c1) based on whether the first information is written in the predetermined section of the object file, an object file specified by the second link command may be determined whether that object file is the first object file.

An information processor according to a second aspect of the present embodiment has: (H) a first generation unit (for example, the first compilation execution unit 141), which, when the first compilation command containing the instruction for executing the link time optimization, generates the first object file containing the source code information but no object code, as well as when the first link command containing the instruction for executing the link time optimization, generates an object code by executing the link time optimization and compilation on the source code information contained in the first object file and generates the second object file containing the generated object code; and (I) a second generation unit (for example, the second compilation execution unit 142), which, when the second link command containing no instruction for executing the link time optimization, generates an object code by executing compilation on the source code information contained in the first object file and generates the third object file containing the generated object code.

Note that it is possible to create a program that causes a processor to perform the processing with the above method, and the program is stored in a computer-readable storage media or storage device such as a flexible disk, a CD-ROM, a magneto-optical disk, a semiconductor memory, and a hard disk, for example. A result of intermediate processing is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   upon reception of a first compilation command that contains an instruction for executing link time optimization, generating a first object file that contains source-code information including a source code and does not contain an object code;
   upon reception of a first link command that contains the instruction for executing the link time optimization, generating the object code by executing the link time optimization and compilation on the source code information contained in the first object file, and generating a second object file that contains the generated object code; and
   upon reception of a second link command that does not contain an instruction for executing the link time optimization, generating the object code by executing the compilation on the source code information contained in the first object file, and generating a third object file that contains the generated object code,
   the generating the first object file includes writing first information indicating that the object code generation is omitted in a predetermined section of the first object file.

2. The non-transitory, computer-readable recording medium of claim 1, the process further comprising:
   upon reception of a second compilation command that does not contain an instruction for executing the link time optimization, generating the object code by executing the compilation on the source code information, and generating a fourth object file that contains the generated object file and does not contain the source code information; and
   upon reception of the second link command after the second compilation command, outputting the fourth object file to a linker.

3. The non-transitory, computer-readable recording medium of claim 2, the process further comprising:
   upon reception of the first link command after the second compilation command, outputting the fourth object file to the linker.

4. The non-transitory, computer-readable recording medium of claim 1, the process further comprising:
  upon reception of a third link command that does not contain an instruction for executing the link time optimization, outputting the third object file to a linker.

5. The non-transitory, computer-readable recording medium of claim 1, wherein
  the generating the third object file includes determining whether an object file specified by the second link command is the first object file, based on whether the first information is written into the predetermined section of the object file.

6. A method comprising:
  upon reception of a first compilation command that contains an instruction for executing link time optimization, generating a first object file that contains source-code information including a source code and does not contain an object code;
  upon reception of a first link command that contains the instruction for executing the link time optimization, generating the object code by executing the link time optimization and compilation on the source code information contained in the first object file, and generating a second object file that contains the generated object code; and
  upon reception of a second link command that does not contain an instruction for executing the link time optimization, generating the object code by executing the compilation on the source code information contained in the first object file, and generating a third object file that contains the generated object code,
  the generating the first object file includes writing first information indicating that the object code generation is omitted in a predetermined section of the first object file.

7. An apparatus comprising:
  a memory; and
  a processor coupled to the memory and configured to:
  upon reception of a first compilation command that contains an instruction for executing link time optimization, generate a first object file that contains source-code information including a source code and does not contain an object code;
  upon reception of a first link command that contains the instruction for executing the link time optimization, generate the object code by executing the link time optimization and compilation on the source code information contained in the first object file, and generate a second object file that contains the generated object code; and
  upon reception of a second link command that does not contain an instruction for executing the link time optimization, generate the object code by executing the compilation on the source code information contained in the first object file, and generate a third object file that contains the generated object code,
  the generating the first object file includes writing first information indicating that the object code generation is omitted in a predetermined section of the first object file.

* * * * *